United States Patent [19]

Martin

[11] 4,426,643

[45] Jan. 17, 1984

[54] ELECTROLYTIC APPARATUS HAVING A STABLE REFERENCE ELECTRODE AND METHOD OF OPERATING SUCH APPARATUS

[75] Inventor: David H. Martin, Eastleigh, England

[73] Assignee: International Business Machines Corporation, Armonk, N.Y.

[21] Appl. No.: 259,268

[22] Filed: Apr. 30, 1981

[30] Foreign Application Priority Data

Jun. 30, 1980 [EP] European Pat. Off. ........ 80302193.0

[51] Int. Cl.³ .............................................. G07G 3/34
[52] U.S. Cl. ................................... 340/713; 340/785; 350/357; 350/363
[58] Field of Search ............... 340/763, 785, 713, 802; 350/357, 363

[56] References Cited

U.S. PATENT DOCUMENTS

| | | | |
|---|---|---|---|
| 3,096,271 | 7/1963 | Hespenheide | 350/363 |
| 4,228,431 | 10/1980 | Barclay et al. | 350/357 |
| 4,306,775 | 12/1981 | Delapierre et al. | 350/363 |
| 4,322,133 | 3/1982 | Uede et al. | 340/785 |

*Primary Examiner*—Marshall M. Curtis
*Attorney, Agent, or Firm*—Joseph E. Kieninger

[57] ABSTRACT

Electrolytic apparatus employing a reference electrode, e.g. an electrochromic display of the type employing potentiostatic control of write or erase operations, has at least one reference electrode on which a predetermined coating thickness of electrochromic or other electrodepositable material is maintained or replenished by intermittent connection of the electrode to a source of write current. Such a coated reference electrode has a stable potential with respect to the solution which is necessary for potentiostatic control. Two such reference electrodes may be used alternately such that one is being erased and rewritten while the other is connected as a reference.

5 Claims, 7 Drawing Figures

ELECTROLYTIC APPARATUS HAVING A STABLE REFERENCE ELECTRODE AND METHOD OF OPERATING SUCH APPARATUS

DESCRIPTION

Technical Field

The present invention relates to electrolytic apparatus employing reference electrodes and to methods of operating such apparatus.

BACKGROUND OF THE INVENTION

Reference electrodes are employed in many electrochemical processes to sense the potential of a solution in an electrolytic cell. The sensed potential is often employed to control the operation of the cell potentiostatically.

One type of electrolytic apparatus to which the invention has specifically been applied is an electrochromic display of the kind employing an electrochromic substance in solution which is transparent while dissolved, but colored when electrodeposited upon an electrode. The colored and transparent states form a redox pair so that the deposited colored material can be electrolytically removed by reversing the current direction. One well known substance of this type is the 1,1'-di-heptyl-4,4'-bipyridinium di-cation which is one of the class of electrochromic substances known as the viologens. Transparent in solution, it can be reduced electrochemically to the radical cation which is violet colored. In the presence of a suitable anion such as bromide, phosphate or phosphate/hypophosphite mixtures, the colored viologen radical salt precipitates out on the cathode.

In order to control the write and erase operation of this type of display, it is known to provide in addition to display and counter electrodes, a reference electrode which senses the potential of the solution. Such a reference electrode can be used to control both write and erase operations depending on the particular control scheme selected.

In one known method of controlling a display, selected display electrodes are written to a predetermined contrast by employing a constant current source for a fixed period of time. Under these conditions, a fixed charge is passed and a fixed amount of material is deposited. If the deposit remained absolutely stable upon the display electrodes and conditions remained unchanged, the written display electrodes could be erased by passing an opposite sense constand current for the same period of time. However, many electrochromic deposits slowly redissolve with the consequence that the electrode would be overerased. The forcing of a constant current after all the electrochromic material has been removed would drive the display electrodes more anodic. Depending on the particular materials employed, this could lead to irreversible electrolytic damage to the display electrodes or to damage by liberation of gases within the cell.

Accordingly, the technique of potentiostatic control of erasure has been employed whereby the potential of the counter electrode is controlled with respect to the solution potential as sensed by a reference electrode in the vicinity of the display electrodes. In the method most commonly employed, the reference electrode potential is compared with a predetermined potential corresponding to substantially complete erasure of the display electrodes and the result of the comparison used to control the potential of the counter electrode. Erase current is thus passed through the cell until the reference electrode potential has dropped to the predetermined level. By allowing a small safety margin, over erasure is prevented. The use of reference electrodes in this way is described in a review article entitled "Electrochromic Displays" (New Electronics, Sept. 16, 1975, page 66).

Another use of reference electrodes is to control the write process by maintaining a threshold potential sufficient for the reduction (or oxidation) of the electrochromic substance. Such a use is described in UK Pat. No. 1376799 (Philips) and U.S. Pat. No. 3,950,077 (Jasinski, Texas Instruments).

U.S. Pat. No. 3,950,077 is primarily concerned with overcoming the alleged disadvantage of a reference electrode that an external potential regulating circuit is required. It proposes a non-polarizable counter electrode which is a lead/lead-phosphate half cell. The potential of such a counter electrode does not vary with respect to the solution as would a simple metallic counter electrode. Because of this the counter electrode potential accurately determines the potential at the display electrode and the need for a reference electrode is avoided.

Our U.S. Pat. Nos. 4,167,309 and 4,167,308 and our published U.K. patent application No. 2038065A corresponding to U.S. Pat. No. 4,256,380 also discuss the limitations of reference electrodes in large displays. These are essentially that, since the reference electrode cannot represent the solution potential over the whole area of the display electrodes, the large variation in potential drop through the solution between different display electrodes and the counter electrode will cause uneven writing and erasure of the display electrodes. One of the patents, U.S. Pat. No. 4,167,309 proposes a reticulate counter electrode covering the whole area of the display which is pre-charged to stabilize its potential. One of several ways of precharging the counter electrode is to charge it with the electrochromic substance (viologen) itself. The redox reaction of the viologen at the counter electrode then acts to stabilize its potential with respect to the solution.

These patent applications acknowledge that the drawbacks of reference electrodes are only severe with large area displays. With small displays, of the order of a few centimeters in width, there is no real alternative to the use of a reference electrode as the counter electrodes are too small to maintain their charge for display operations and attempts to increase their area would compromise the visibility of the display electrodes.

References to the actual nature of the reference electrode in the prior art are scanty. The implication is that any conductor will do. The Philips UK Pat. No. 1376799 suggests that the reference electrodes may be of the "same material as the image electrodes" or alternatively can be made from "glass, calomel or the like."

The suggestions as to appropriate reference electrodes in the prior art have been found to be inadequate for a practical small display. A standard calomel reference electrode is a large cumbersome half cell which would have to be remote from the display cell and draw fluid from it by a capillary tube. The simpler prospect of using an electrode similar to the display electrode or a simple wire proves unsatisfactory in that the potential of the electrode is unstable with respect to the solution.

Experimental studies have demonstrated that the potential of a silver wire electrode in a viologen display varies and will drift over a period of time. Such variations can be caused by capacitive and leakage currents in the electrode or by impurities in the solution which react with the silver electrode.

Although the potential of a small reference electrode can be stabilized by deposition of a sufficient charge of electrochromic material thereon, this of itself does not provide a practical reference electrode since such deposits dissolve away.

These considerations, although particularly applicable to electrochromic displays, are also relevant to other electrolytic apparatus employing a reference electrode.

DISCLOSURE OF THE INVENTION

Accordingly at its broadest, the present invention provides an electrolytic apparatus comprising: a cell having a working electrode (35), a counter electrode (34) and a reference electrode (30 or 31) and containing an electrolyte including a reversibly electrodepositable material in solution and drive means (38, 39, 40, 41, 76) for electrodepositing the material on or electrolytically removing the material from the working electrode, either the deposition or removal being controlled with reference to the solution potential sensed by the reference electrode, characterized in that the apparatus further comprises: first switching means (73) for connecting the reference electrode to a source of electric current to cause deposition of the material on the reference electrode, second switching means (75) for connecting the reference electrode to the drive means to provide an indication of the solution potential, and reference control means (64, 75, 66) for controlling the first and second switching means to operate alternately so that the reference electrode has a deposit of material sufficient to stabilize its potential with respect to the solution prior to being connected to the drive means.

Considered from the display aspect, the present invention provides an electrochromic display comprising: a cell having a display electrode, a counter electrode and a reference electrode and containing a solution of a reversibly electrodepositable electrochromic material, and display drive means for writing said display electrode by electrodeposition of the electrochromic material thereon and erasing said electrode by electrolytic removal of the electrochromic material, either the write or erase operation being controlled with reference to the solution potential sensed by the reference electrode, characterized in that the display further comprises: first switching means for connecting the reference electrode to a source of electric current to cause deposition of the electrochromic material on the reference electrode; second switching means for connecting the reference electrode to the display drive means to provide an indication of the solution potential, and reference control means for controlling the first and second switching means to operate alternately so that the reference electrode has a deposit of electrochromic material sufficient to stabilize its potential with respect to the solution prior to being connected to the display drive means.

By providing a permanent means of depositing electrochromic or other electrodepositable material on the reference electrode, the necessary deposit can be replenished or replaced whenever the reference is not in use.

It is normally desirable to have a continually available reference and to this end it is a preferred feature of the invention to provide two such reference electrodes each having a respective first and second switching means, the reference control means causing alternate operation of the second switching means so that one of the reference electrodes is always connected to the display drive means.

In order to ensure that the predetermined amount of electrochromic material is deposited on the reference electrodes, it is preferred that the display also comprises a pair of third switching means for connecting respectively each of the reference electrodes to a source of erase current to remove any electrochromic material therefrom, the reference control means being arranged to operate the third, first and second switching means of each reference electrode in succession and so that the second switching means of either reference electrode is operated concurrently with the successive operation of the third and first switching means of the other reference electrode.

In order to facilitate the erasure of each reference electrode, it is also a preferred feature that the potential of the source of erase current is maintained in fixed relation with that of the reference electrode currently connected by its second switching means to the display drive means. This can be achieved by having an offset amplifier as the source whose input is connected to the reference electrodes by the second switching means and whose output is connected to the reference electrodes by the third switching means.

Preferably this source of erase current is also common to the display drive means and is selectively connectable to the display electrode to erase it.

Thus, the invention provides a method of operating an electrolytic apparatus comprising a cell (33), a working electrode (35), a counter electrode (34) and a reference electrode (30 or 31), the cell being filled with an electrolyte including a reversibly electrodepositable material in solution, the method comprising the steps of electrolytically depositing said material on or removing said material from the working electrode (35) by passing a current in an appropriate direction between the counter (34) and working (35) electrodes, sensing the solution potential in the neighborhood of the working electrode (35) by means of the reference electrode (30 or 31) and controlling either the deposition of said material on the working electrode (35) or the removal of said material from the working electrode (35) by means of the sensed solution potential, the method being characterized in that the sensing step comprises a discontinuous sequence of sensing operations and by the further step of passing a current through the electrolyte to cause deposition of said material onto the reference electrode (30 or 31) in the intervals between the sensing operations so that the reference electrode (30 or 31) is written with a deposit of a predetermined amount of said material which stabilizes its potential with respect to the solution.

From a display aspect the invention provides a method of operating such a display comprising the steps of writing or erasing the display electrode by passing current between the counter and display electrodes respectively to deposit the electrochromic material on or to remove the electrochromic material from the display electrode, sensing the solution potential in the neighborhood of the display electrode by means of the reference electrode and controlling either the writing or erasing of the display electrode by means of the sensed solution potential, the method being characterized in that the sensing step comprises a discontinuous sequence of sensing operations and by the further step of passing a write current through the solution to cause deposition of the electrochromic material onto the reference electrode the reference electrode is written with a deposit of a predetermined amount of electrochromic material which stabilizes its potential with respect to the solution.

DETAILED DESCRIPTION

Before describing the detailed arrangement and control of reference electrodes in an electrochromic display according to the invention, a basic method for writing and erasing such displays will first be discussed in connection with FIGS. 1 and 2. The cell schematically illustrated in FIG. 1 contains a solution of an electrochromic substance such as viologen, a preferred form being a mixture of 1,1' di-heptyl-4,4'- bipyridinium phosphate and hypophosphite as described in published European patent application No. 0001912.

Within the cell are shown three electrodes, a display electrode 10, a counter electrode 11 and a reference electrode 12. In practice, the display electrode 10 is one of a number of display electrodes which are selected as picture elements (pels) in accordance with the information to be displayed. However, only one such electrode is shown for ease of explanation. A preferred form of display electrode for a viologen electrochromic system is a rough plated silver electrode. The rough silver acts as a diffuser of light and has a matt white appearance when unwritten. The rough surface also has electrochemical advantages as explained in published European patent application No. 0004548. The preferred counter electrode for this type of system is a platinum black plated foil at one side of the display cell.

The reference electrode 12 is an electrical conductor which is assumed to have a stable potential with respect to the solution. Preferably the reference electrode will be of the same material as the display electrodes, in this case silver.

The contrast achievable with such a display is porportional to the electric charge passed. To ensure uniformity of color, a constant current writing method is employed. Thus, to write display electrode 10, the counter electrode 11 is connected to a source of potential +V and a constant current source 13 is connected to the floating display electrode 10 via switch 14 for a predetermined time period. The passage of a predetermined amount of charge results in the reduction of a corresponding amount of viologen to its colored radical cation state at the electrode 10. The reduced radical cation combines with the anions in the solution and precipitates on the display electrode. For an adequate contrast, with the viologen system described, a charge of about 3mC cm$^{-2}$ is needed. The reference electrode plays no part in the write operation and is disconnected by a switch 15.

Figure 2:
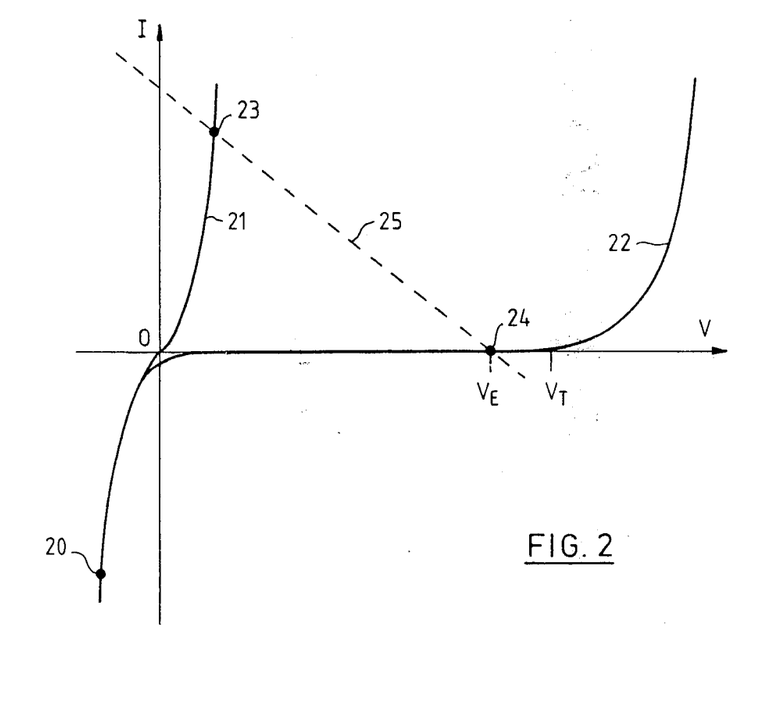
FIG. 2 shows the variation of current with voltage in the cell of FIG. 1 under different display conditions.

With reference to FIG. 2, conditions at the display electrode during the write process are represented by a point 20 on the common portion of two curves 21 and 22 in the lower left hand quadrant. The potential of the display electrode is essentially determined by the value chosen for the constant current from source 13. When the write step has finished and the current source 13 is disconnected, the potential of the display electrode will rise to a rest potential arbitrarily shown as zero on the curve. This is the potential of a disconnected viologen coated silver electrode in a viologen solution. An electrode so written will remain coated with viologen for some time in the absence of an externally applied potential. This is the so called "memory" effect of this type of electrochromic display.

Figure 1:
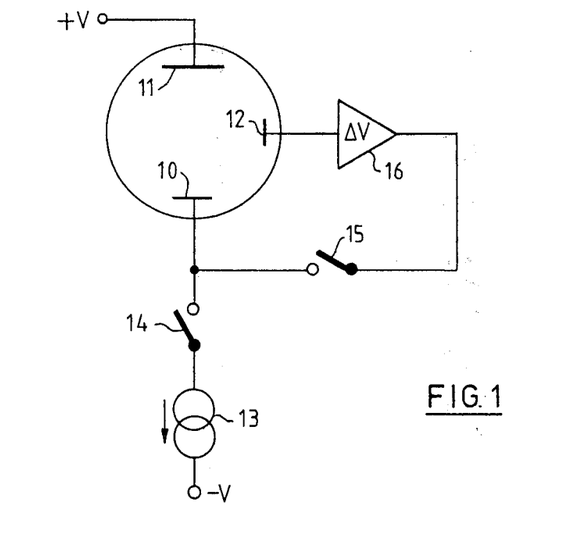
FIG. 1 shows schematically a write and an erase circuit arrangement for an electrochromic display cell, employing a reference electrode.

Considering now the erase process, the upper portion of curve 21 (FIG. 2) shows the variation of current through a cell such as that of FIG. 1 for a written display electrode which is being driven anodic. As long as the electrode remains coated with viologen, the erase current rises exponentially in similar fashion to the write process. The curve 21 corresponds to the oxidation of viologen radical cation back to the dication which redissolves in the solution. This process is terminated by the removal of all the viologen from the electrode.

By way of comparison, if an unwritten electrode is driven anodic, curve 22 shows that no significant current flows until a potential $V_T$ is exceeded after which current increases rapidly. This increase in current corresponds to unwanted side reactions of the display electrode. In the case of a viologen on silver system, $V_T$ is about 550 mV and the side reaction is the irreversible anodization of the silver to a black form. If the erase process is controlled potentiostatically, the display electrode potential can be limited to a value $V_E$ which, while corresponding to complete erasure, stops short of the side reaction threshold $V_T$.

Potentiostatic erasure is effected in the cell of FIG. 1 by closing a switch 15 to connect the output of an offset buffer 16, which is a high input impedance amplifier, to the electrode 10. The input to the amplifier 16 is the solution potential sensed by the reference electrode 12. The offset V of the amplifier is made equal to the potential difference $V_E$. Without drawing current from the reference electrode, the amplifier 16 supplies erase current to display electrode 10 until its potential reaches the output potential $V_{ERASE}$ of the offset amplifier which is $V_E$ with respect to the reference electrode.

Initially the current is high, as shown at point 23 of curve 21 and remains at this level until the viologen is almost removed. The difference between the potential of the electrode 10 at point 23 and the target erase potential $V_E$ is accounted for by the I.R. drop in the cell. Point 23 and a point 24 corresponding to complete erasure lie on a load line 25 which the potential of the electrode 10 follows as the last viologen is removed and the current in the cell falls.

The implementation of potentiostatic erasure by means of an offset buffer connected to the display rather than to the counter electrode, although different from that shown in the New Electronics article, is electrically equivalent and has advantages in connection with the invention which will become apparent.

Successful repeated employment of potentiostatic erasure as described above depends on the potential of the reference electrode being stable at all times with respect to the solution. It is found, however, that the potential of a silver wire reference electrode in a viologen solution does not remain stable but tends to drift. Variations of potential may be caused by capacitive and leakage currents in the solution charging the reference electrode to a different potential or by the effect of deposited impurities on the surface of the reference electrode.

Figures 3, 5:
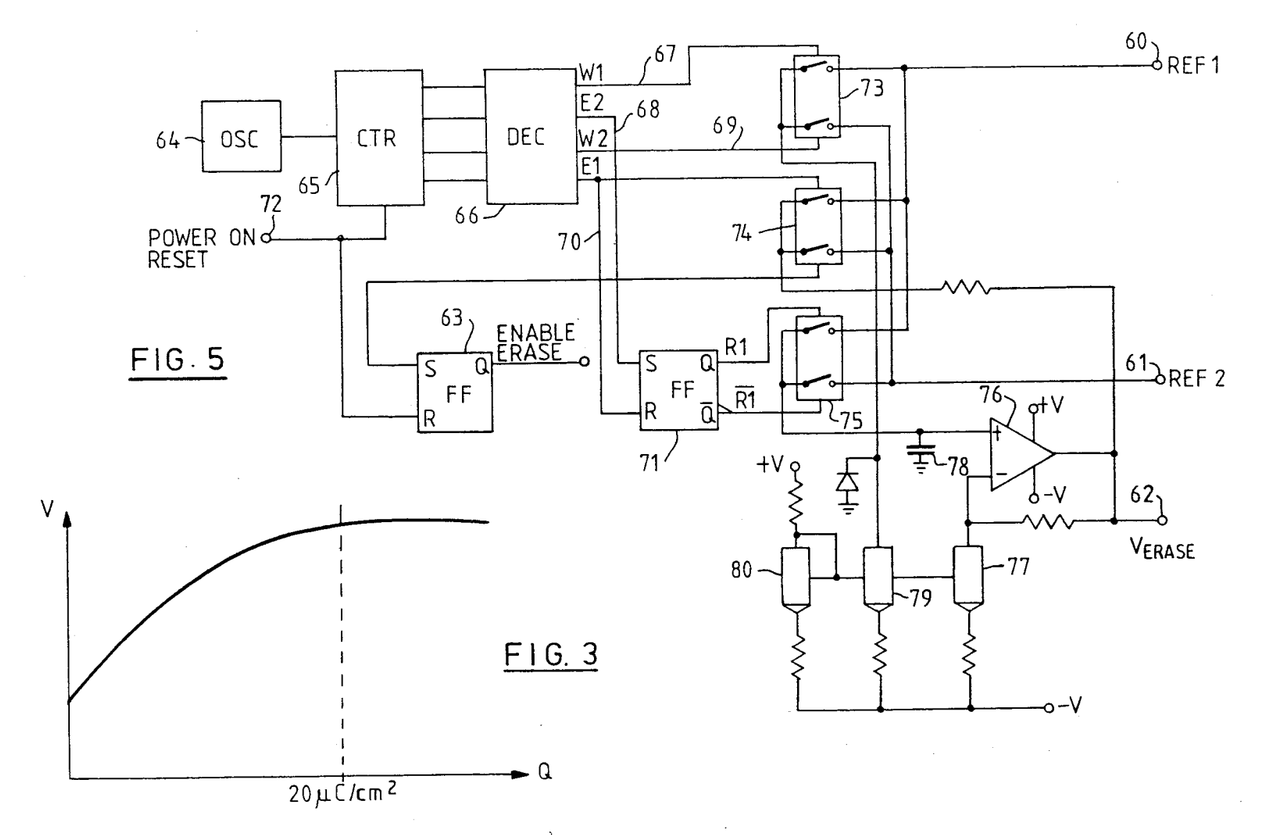
FIG. 3 shows the variation of reference electrode potential with charge in the cell of FIG. 1.
FIG. 5 shows in detail a reference control circuit forming part of the circuitry of FIG. 4.

The potential of a silver wire electrode also increases if viologen is deposited thereon in the same manner as on a display electrode. The reduction and deposition of viologen is equivalent to electrically charging the electrode and a typical curve showing variation of potential with charge is shown in FIG. 3. The unpredictable variations in potential were found to occur only in the lower portion of the curve. At higher charge levels, above $20 \mu C \ cm^{-2}$, the potential is stable and corresponds to the potential of the viologen redox reaction rather than that of the silver itself. Such a coated wire can therefore function as a reference electrode providing that the coating which re-dissolves fairly rapidly in the order of a minute can be maintained or replenished.

Figure 4:
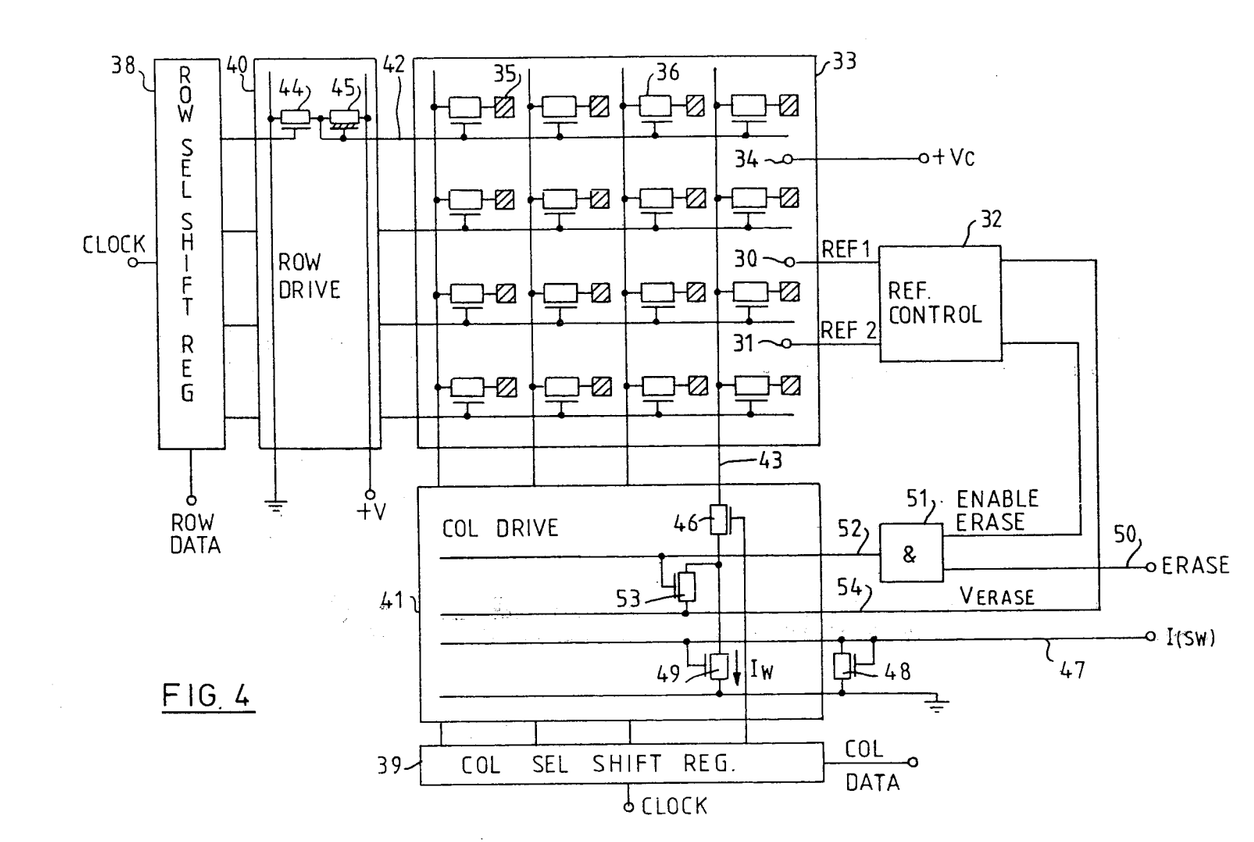
FIG. 4 shows schematically an electrochromic display and associated drive circuitry according to the invention, which employs dual reference electrodes.

In FIG. 4, there is shown an electrochromic display, operating according to the basic principles of FIG. 1 and FIG. 2, but which is provided with dual reference electrodes 30 and 31. These electrodes alternately cycle between "reference" and "refresh" modes under control of reference control circuit 32. The control circuit 32 ensures that one of these two electrodes is always in the reference mode in which it is coated with sufficient viologen to stabilize its potential as described in connection with FIG. 3. While one of the electrodes 30 and 31 is in the reference mode, the other is being erased and rewritten. The erasure of the electrode to be refreshed is desirable so that the amount of viologen subsequently rewritten can be accurately controlled. The detailed operation of the reference control circuit 32 will be described shortly in connection with FIG. 5 after first describing further the display and display drive circuit of FIG. 4.

The display comprises a sealed cell 33 containing an aqueous solution of a mixture of 1,1' di-heptyl-4,4'-bipyridinium phosphate and hypophosphite. Within the cell, in addition to the reference electrodes 30 and 31, is a platinum black counter electrode 34, connected to a source of potential $V_c$, and an array of identical matt silver display electrodes 35, each constituting one picture element or "pel." For ease of illustration, only sixteen pels are shown, arranged in a four by four array. In practice, a much larger number would be employed.

The pels 35 are formed over a corresponding array of field effect transistors 36 and each pel is electrically connected to the drain of an associated FET 36 by via metallurgy. The FET's are themselves formed on a silicon substrate and overlaid with inorganic and organic passivation layers.

The write and erase operations of the display cell 33 are controlled by associated display drive circuits in response to externally supplied control signals. The write operation is a constant current process and the erase operation is potentiostatic, as shown in principle in FIGS. 1 and 2, but with the difference that a large number of display electrodes are involved.

Each of the pels 35 may be individually selected for writing by means of its associated FET 36 which behaves as a switch. The individual pels are identified by means of row and column data loaded into shift registers 38 and 39. The row and column shift reigsters control associated row and column drivers 40 and 41 which activate selected row and column lines 42 and 43 to the gates and sources respectively of the FET matrix. Thus, if a row line 42 is activated, that row of FET's connect the pels 35 of the row to any write or erase currents flowing on column lines 43.

The row drive circuit 40 comprises a string of transistor pairs, such as enhancement mode device 44 and depletion mode device 45, each associated with one stage of the shift register 38. These two devices form a line driving inverter which isolates the shift register circuit from the loading of the row select line.

The column driver 41 is slightly more complicated in that it has to provide both erase and write current to the lines 43. Selection of a line 43 for either operation is by means of a transistor switch 46 in accordance with the contents of an associated shift register stage.

The write operation is selected by switching a reference current $I_{(SW)}$ to the write line 47. Transistor 48 controls the gate voltage of a number of coupled transistors 49 such that they act as current sources of magnitude equal to the reference current, one for each column, equivalent to the sources 13 of FIG. 1. Thus, if a selection transistor 46 is on, a constant current, $I_w$, will be drawn from the associated column line 43. The writing process is such that the display is written one row at a time so that only a single FET 36 in any column can be on at any given time.

The potentiostatic erase process is also controlled by the row and column drivers and can be a block operation. In other words all pels, both written and unwritten, in an area to be erased are selected by loading the row select and column select shift registers 38 and 39 with the appropriate data pattern. The erase operation is selected by the application of an externally generated ERASE signal to line 50. In an ENABLE ERASE signal has been generated by control circuit 32 an AND gate 51 raises a line 52 to switch on a string of transistors 53. These transistors, when switched on, connect the potentiostatic erase voltage $V_{ERASE}$ applied on a line 54 to all the selected column lines 43 via transistors 46. The potentiostatic erase voltage is generated from the solution potential sensed by reference electrodes 30 and 31 by an offset amplifier in reference control circuit 32 similar to amplifier 16 of FIG. 1. Because the potentiostatic erase process is self limiting, no damage results from the selection and connection of unwritten as well as written pels to the erase potential.

The reference control circuit 32 of FIG. 4 is shown in detail in FIG. 5. Essentially, the two reference electrodes 30 and 31 are connected to terminals 60 and 61 in the control circuit and the erase potential, $V_{ERASE}$, required on line 54 of the column drive is provided at output 62 of the control circuit.

The reference control circuit is driven by a timing circuit which produces a number of control signals W1, W2, R1, E1 and E2. These determine whether the individual reference electrodes 30 and 31 are in reference or refresh modes and, if in refresh mode, whether they are being erased or rewritten. The timing circuit comprises an oscillator 64 whose output pulses are counted by a counter 65. The counter output is decoded by a decoder 66 which sequentially activates lines 67–70 to produce the control signals W1, E2, W2 and E1 in that order. The signal R1 is produced by a flip-flop 71 which is set and reset by signals E1 and E2. The counter is reset to zero each time the display is powered up by a POWER ON RESET signal at terminal 72.

The control signals are applied to a number of analog switches 73, 74 and 75 which are responsive to the signals to make the appropriate connections. At the heart of the circuit, the switch 75 in response to reference control signal R1 determines which of the reference electrodes is in "reference" mode and connects that electrode to the positive input of a high input impedance and negative feedback amplifier 76. The output of the amplifier is the offset erase potential $V_{ERASE}$ at terminal 62 and is determined by the solution potential sensed by the reference electrode currently connected and a built-in offset voltage.

To produce the desired offset, a transistor 77 draws a constant current through an emitter resistor from the feedback loop of the amplifier. A capacitor 78 smooths any transients at the amplifier input when the switch 75 alternates the reference electrodes.

The offset amplifier 76 is employed not only for display erasure, but also for reference electrode erasure. Erasure of the reference electrode in refresh mode is carried out potentiostatically with reference to the solution sensed by the reference electrode in reference mode. The erase potential $V_{ERASE}$ at the amplifier output is connected by switch 74 in response to either E1 or E2 to the respective electrode to be erased.

Once a reference electrode has been erased, the appropriate signal W1 or W2 causes that electrode to be rewritten by closing one contact of switch 73. Closure of switch 73 connects the reference electrode to a constant current source formed by two transistors 79 and 80 and their associated emitter resistors. The transistor 80 provides the reference constant current for both transistors 79 and 77.

The current source 79 is connected for the duration of signal W1 or W2 so that sufficient viologen is deposited to produce a reference of stable potential. As soon as the reference electrode has been written, the switch 75 is operated to connect it as reference input to the offset buffer. This alternate cycling between reference and refresh modes continues while the display is powered and is completely asynchronous with the normal write and erase operations of the display. The cycle time is of the order of 10 seconds which is sufficient to allow $20\mu C\ cm^{-2}$ to be written and erased in this particular system. The variant of potentiostatic erasure employed, in which the working rather than the counter electrode is manipulated permits a reference electrode to be erased even though the display is being written and vice versa. The reference and refresh operations are not affected by and do not themselves affect the concurrent display operation.

When the display is first powered up, the state of the reference electrodes is unknown. It is very likely that neither is written, since any viologen left from the last operational cycle of the display will have redissolved into the solution. Consequently, neither of the electrodes 30 and 31 is a reliable reference, and the first operation of the new reference control cycle is to write electrode 30 in response to signal W1. As soon as electrode 30 has been written, the signal E2 is produced to attempt to erase reference electrode 31, and signal R1 simultaneously connects electrode 30 as reference. Signal E2 is used to set the flip-flop 63 which was reset when terminal 72 received the "power-on reset" signal. The setting of flip-flop 63 produces the ENABLE ERASE signal for AND circuit 51 (FIG. 4). In this manner, display erasure is initially inhibited until one reference electrode has been written.

The control and operation of a display cell employing dual reference electrodes has been described in detail in connection with FIGS. 4 and 5. The physical structure of this cell and of the electrodes will now be described in further detail in connection with FIGS. 7 and 7.

Figure 6:
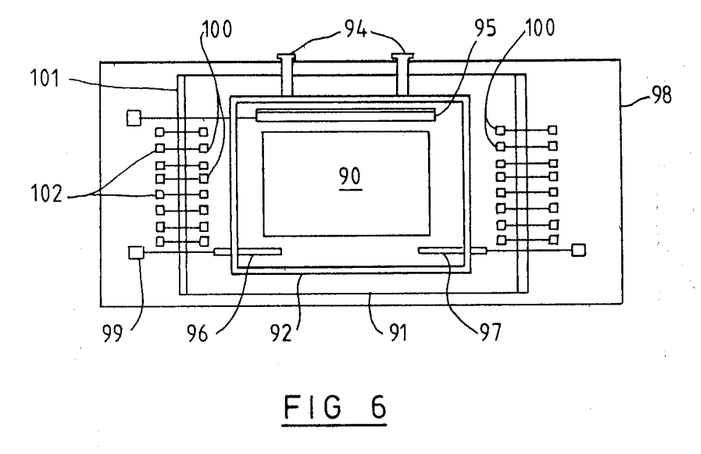
FIG. 6 is a plan view showing the physical structure of the display of FIG. 5.

FIG. 6 shows a display cell in which an array 90 of matt silver display electrodes corresponding to electrodes 35 of FIG. 4 is formed over an array of FET's integrated on a silicon wafer 91. The display electrodes 90 are sealed within a rectangular frame 92 and cover 93 made of transparent acrylic material. Filler tubes 94 passing through one wall of the frame enable the cell to be filled with an aqueous solution of a mixture of 1,1'-di-heptyl-4,4'-bipyridinium phosphate and hypophosphite and subsequently sealed. The counter electrode is an L section platinum foil strip 95 on which platinum black has been deposited and is located along one edge of the display cell. A pair of reference electrodes 96 and 97, equivalent to electrodes 30 and 31 of FIG. 4, are located adjacent the opposite edge of the display and consist of fine silver rods about 1mm in diameter. These rods pass through and are sealed into the frame 92 of the cell.

The wafer 91 and display cell are mounted on a copper block heat sink (not visible) which itself is mounted on a printed circuit board 98 carrying circuitry (not shown). Wires to pads 99 on the printed circuit board connect the reference electrodes to external circuitry on the board including the reference control circuit of FIG. 5. The counter electrode 95 is similarly connected by wire to a pad on the circuit board.

The silicon wafer 91 includes not only the FET matrix for switching the pels, but also the row and column select and drive circuits shown in FIG. 4. External connection to these circuits is made by way of pads 100 on the periphery of the wafer outside the frame. Fine wires connect these pads over an insulating sleeve 101 on the edge of the wafer to a complementary array of pads 102 on the printed circuit board.

Figure 7:
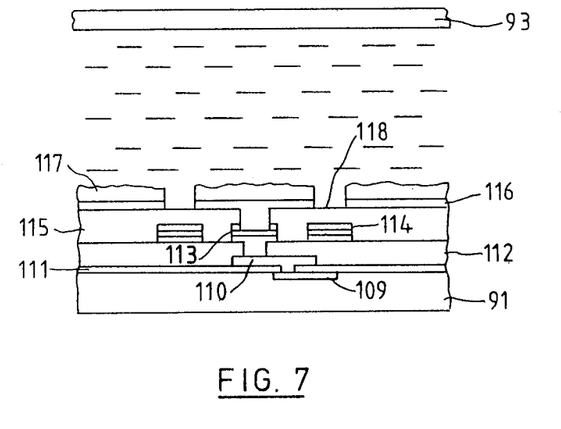
FIG. 7 shows a cutaway view through a portion of the display of FIG. 6 to illustrate the integrated display electrode structure.

The actual structure of the display electrodes forming array 90 and their connection to the underlying FET matrix in wafer 91 is shown on an exaggerated scale in FIG. 7. Hatch lines have not been used in this schematic sectional view in the interests of clarity.

The underlying silicon substrate 91 has formed on it by conventional FET technology the array of FET's 36 and selection lines 42 and 43 illustrated in FIG. 4. One diffusion region 109 constituting a drain of one of the FET's is shown connected to a portion of an overlying aluminum selection line 110 through an opening in a layer 111 of thermal silicon dioxide. The aluminum lines and the underlying silicon are covered in conventional fashion by an inorganic passivation layer 112 of silicon dioxide which has via holes through it to provide a path for connection to the drains of the FET's. A triple layer of chromium/gold/chromium is evaporated over the silicon dioxide layer 112 and etched through a mask into discrete regions as shown. Some of these regions 113 provide an electrically conductive path through the via to the FET. Other regions 114 serve as light barriers beneath the inter pel gaps to prevent the generation of stray currents by photoconduction in the substrate 91.

An organic passivation layer of polyimide is next deposited over the triple layer regions and selectively etched to expose the via metallurgy. The top layer of chromium in the vias is etched away to leave a clean bare gold surface.

Next a silver layer 116 is evaporated over the entire array area and makes electrical contact with the gold in the vias. Further, silver is then electroplated through a resist pattern onto the evaporated silver to define the display electrodes 117. Finally, gaps 118 between the display electrodes are opened by removing the resist and etching away the underlying evaporated silver back to the polyimide.

Although in the display described, silver rods or wires have been employed as reference electrodes, it should be realized that other metals could be employed. Also, the reference electrodes could be deposited on the same substrate as the display electrodes providing they were not in the field of view.

Although two reference electrodes operating alternately are preferred, a single reference electrode could be employed if it could be replenished during display operations, such as constant current writing, for which no reference is needed.

Although the display described in FIGS. 6 and 7 employs an array of identical picture elements, the invention is in no sense restricted to this type of display. The electrodes could instead be in the form of characters as for a watch or calculator display. Furthermore, although a display integrated on silicon together with associated circuitry has been described, the principles of the invention are equally applicable to a simpler display employing discrete wholly external circuits and another substrate, such as glass, for supporting the electrodes.

Finally, although the invention has been specifically described in terms of an electrochromic display, the invention is applicable to any electrolytic apparatus employing a reference electrode e.g. a plating apparaus which is potentiostatically controlled.

I claim:

1. An apparatus for use with a source of electric current and an electrochromic cell having a working electrode, a first reference electrode for sensing the potential of the cell and drive means for depositing material on and removing material from the working electrode, said apparatus comprising first switching means for connecting the first reference electrode to a first source of electric current to cause deposition of material on the first reference electrode, second switching means for connecting the first reference electrode to the drive means to provide an indication of the cell potential, a second reference electrode in said cell, said second electrode adapted to serve as an alternate for the first reference electrode in sensing the potential of the cell, said second electrode adapted to serve as a control during the potentiostatic erasure of the first reference electrode, third switching means for connecting said second reference electrode to a first source of electric current to cause deposition of material on the second reference electrode, fourth switching means for connecting said second reference electrode to the drive means to provide an indication of the cell potential, and reference means connected to said first and second switching means for controlling the deposition of material on the first reference electrode, said reference control means connected to said third and fourth switching means for controlling the deposition of material on said second reference electrode wherein said reference means causes alternate operation between said second and said fourth switching means so that only one of the reference electrodes is always connected to the drive means.

2. An apparatus as described in claim 1 wherein said reference control means includes a clock pulse source, a counter and a decode circuit.

3. An apparatus as described in claim 1 including a fifth switching means for connecting one of said reference electrodes to a second source of electric current and to cause the removal of material on said reference electrode.

4. An apparatus as described in claim 3 wherein said second source of current is an offset amplifier.

5. An apparatus as described in claim 3 wherein said second source of current is selectively connectable to the working electrode.

* * * * *